US012585078B2

(12) United States Patent
Nagaoka et al.

(10) Patent No.: US 12,585,078 B2
(45) Date of Patent: Mar. 24, 2026

(54) LENS BARREL AND IMAGING DEVICE

(71) Applicant: NIKON CORPORATION, Tokyo (JP)

(72) Inventors: Koji Nagaoka, Yokohama (JP); Takuji Hamasaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 369 days.

(21) Appl. No.: 18/035,546

(22) PCT Filed: Dec. 9, 2021

(86) PCT No.: PCT/JP2021/045315
§ 371 (c)(1),
(2) Date: May 5, 2023

(87) PCT Pub. No.: WO2022/124364
PCT Pub. Date: Jun. 16, 2022

(65) Prior Publication Data
US 2023/0393364 A1 Dec. 7, 2023

(30) Foreign Application Priority Data
Dec. 9, 2020 (JP) ................................. 2020-203965

(51) Int. Cl.
*G02B 7/02* (2021.01)
*G02B 7/10* (2021.01)
*H04N 23/00* (2023.01)

(52) U.S. Cl.
CPC ............... *G02B 7/021* (2013.01); *G02B 7/10* (2013.01); *H04N 23/00* (2023.01)

(58) Field of Classification Search
CPC . G02B 7/021; G02B 7/10; G02B 7/04; G02B 7/102; H04N 23/00
See application file for complete search history.

(56) References Cited

U.S. PATENT DOCUMENTS

2016/0062133 A1* 3/2016 Espersen .............. G02B 27/646
359/557

FOREIGN PATENT DOCUMENTS

| JP | 2007-232889 A | 9/2007 |
| JP | 2011-22427 A | 2/2011 |
| JP | 2012-189711 A | 10/2012 |
| JP | 2019-168492 A | 10/2019 |

OTHER PUBLICATIONS

Feb. 20, 2024 Office Action issued in Japanese Patent Application No. 2022-568326.
Jul. 30, 2024 Office Action issued in Japanese Patent Application No. 2022-568326.
Jun. 13, 2023 International Preliminary Report on Patentability issued in International Patent Application No. PCT/JP2021/045315.

(Continued)

*Primary Examiner* — James C. Jones
(74) *Attorney, Agent, or Firm* — Oliff PLC

(57) ABSTRACT
A lens barrel having good optical performance, the lens barrel includes a first lens holding frame that holds a first lens, a first guide bar that guides the first lens holding frame in an optical axis direction, a contact member that is in contact with the first guide bar, and a biasing member that is in contact with the first lens holding frame and biases the contact member toward the first guide bar.

20 Claims, 10 Drawing Sheets

1

(56)     References Cited

OTHER PUBLICATIONS

Feb. 22, 2022 International Search Report issued in International
Patent Application No. PCT/JP2021/045315.
Sep. 11, 2025 Office Action issued in Chinese Patent Application
No. 202180081411.6.
Jan. 6, 2026 Office Action issued in Chinese Patent Application No.
202180081411.6.

* cited by examiner

FIG. 3A
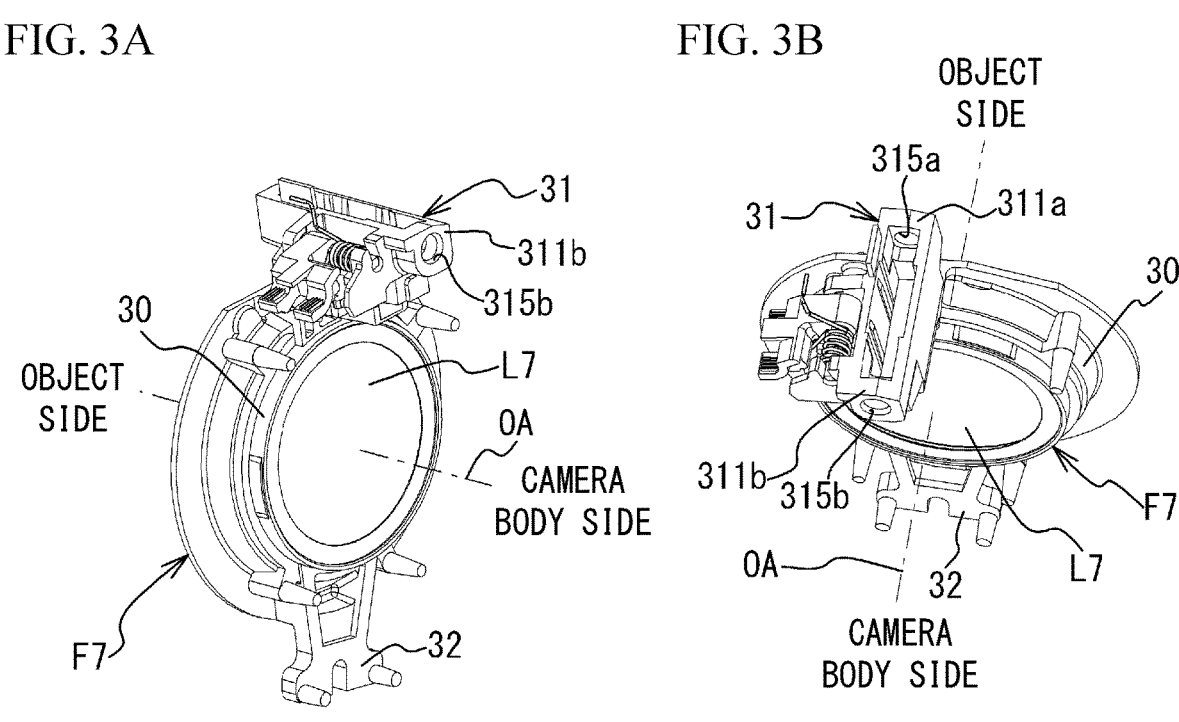
FIG. 3B
FIG. 3C
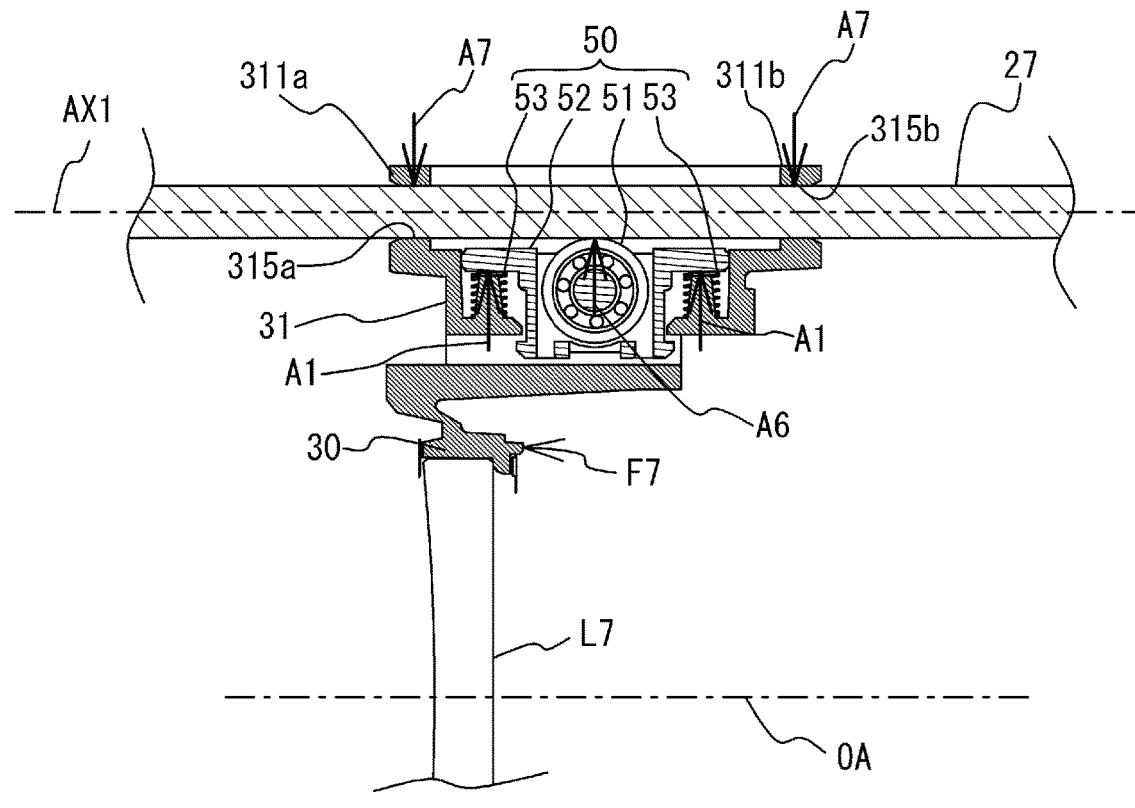

CAMERA
BODY SIDE

OBJECT
SIDE

LENS BARREL AND IMAGING DEVICE

TECHNICAL FIELD

The present invention relates to a lens barrel and an imaging device.

BACKGROUND ART

Good optical performance is required for lens barrels (e.g., Patent Document 1).

PRIOR ART DOCUMENT

Patent Document

Patent Document 1: Japanese Patent Application Laid-Open No. 2019-168492

SUMMARY OF THE INVENTION

In a first aspect, there is provided a lens barrel including: a first lens holding frame that holds a first lens; a first guide bar that guides the first lens holding frame in an optical axis direction; a contact member that is in contact with the first guide bar; and a biasing member that is in contact with the first lens holding frame and biases the contact member toward the first guide bar.

In a second aspect, there is provided an imaging device including: the above lens barrel, and an imaging element.

Note that the configurations of the embodiments described below may be appropriately modified, and at least some of the components may be replaced with other components. Furthermore, constituent elements whose arrangement is not particularly limited are not limited to the arrangement disclosed in the embodiment, and can be arranged at positions where their functions can be achieved.

BRIEF DESCRIPTION OF THE DRAWINGS

FIG. 3A and FIG. 3B are schematic perspective views of a seventh lens holding frame, and FIG. 3C is a cross-sectional view for describing engagement between the seventh lens holding frame and a guide bar;

MODES FOR CARRYING OUT THE INVENTION

Hereinafter, a lens barrel 100 in accordance with an embodiment will be described in detail with reference to the drawings. In each drawing, illustration of some elements may be omitted in order to facilitate understanding.

Figure 1:
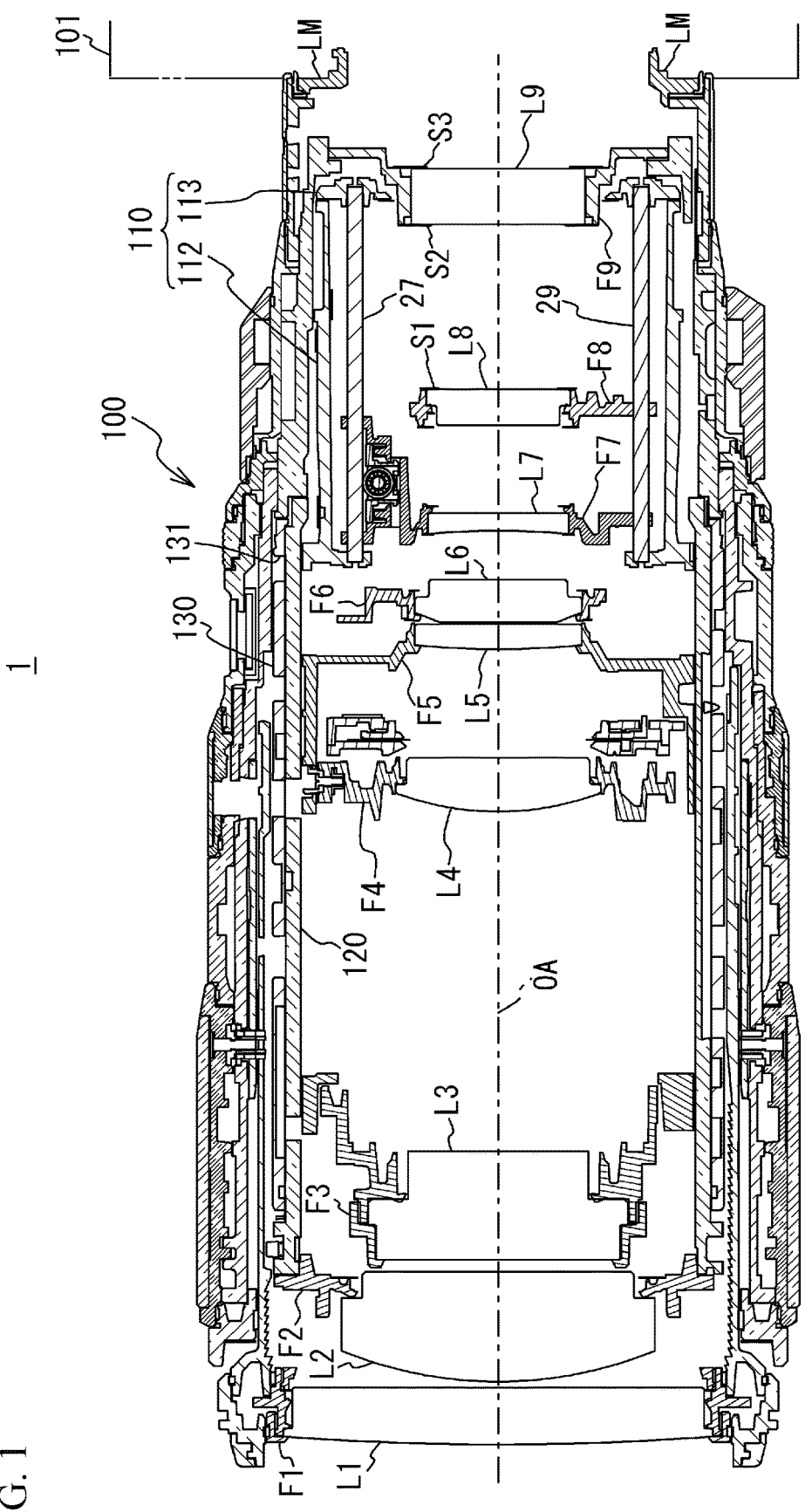
FIG. 1 is a diagram illustrating a camera including a lens barrel in accordance with an embodiment and a camera body.

FIG. 1 is a diagram illustrating a camera 1 including the lens barrel 100 in accordance with the present embodiment and a camera body 101. In the present embodiment, the lens barrel 100 is attachable to and detachable from the camera body 101 by a lens mount LM. Although the lens barrel 100 is attachable to and detachable from the camera body 101, the lens barrel 100 and the camera body 101 may be integrated with each other.

The camera body 101 includes an imaging element (not illustrated) that captures an object image formed by lens groups arranged in the lens barrel 100 and converts the object image into an electric signal.

As illustrated in FIG. 1, the lens barrel 100 in accordance with the present embodiment includes a first lens group L1 to a ninth lens group L9 that are sequentially arranged along a common optical axis OA. The first lens group L1 to the ninth lens group L9 are held by a first lens holding frame F1 to a ninth lens holding frame F9, respectively. In the lens barrel 100 in accordance with the present embodiment, each of the seventh lens group L7 and the eighth lens group L8 is a focus lens group. Each lens group may be composed of one lens or may be composed of a plurality of lenses.

The lens barrel 100 further includes a first guide bar 27, a second guide bar 28 (not illustrated in FIG. 1), and a rotation restricting bar 29. The first guide bar 27 guides the seventh lens holding frame F7 in the optical axis OA direction, and the second guide bar 28 guides the eighth lens holding frame F8 in the optical axis OA direction. The rotation restricting bar 29 restricts the rotation of the seventh lens holding frame F7 about the first guide bar 27 and the rotation of the eighth lens holding frame F8 about the second guide bar 28. The first guide bar 27, the second guide bar 28, and the rotation restricting bar 29 are fixed to a movable barrel 110 that moves in the optical axis OA direction according to the user's operation of the zoom control ring.

Figure 2:
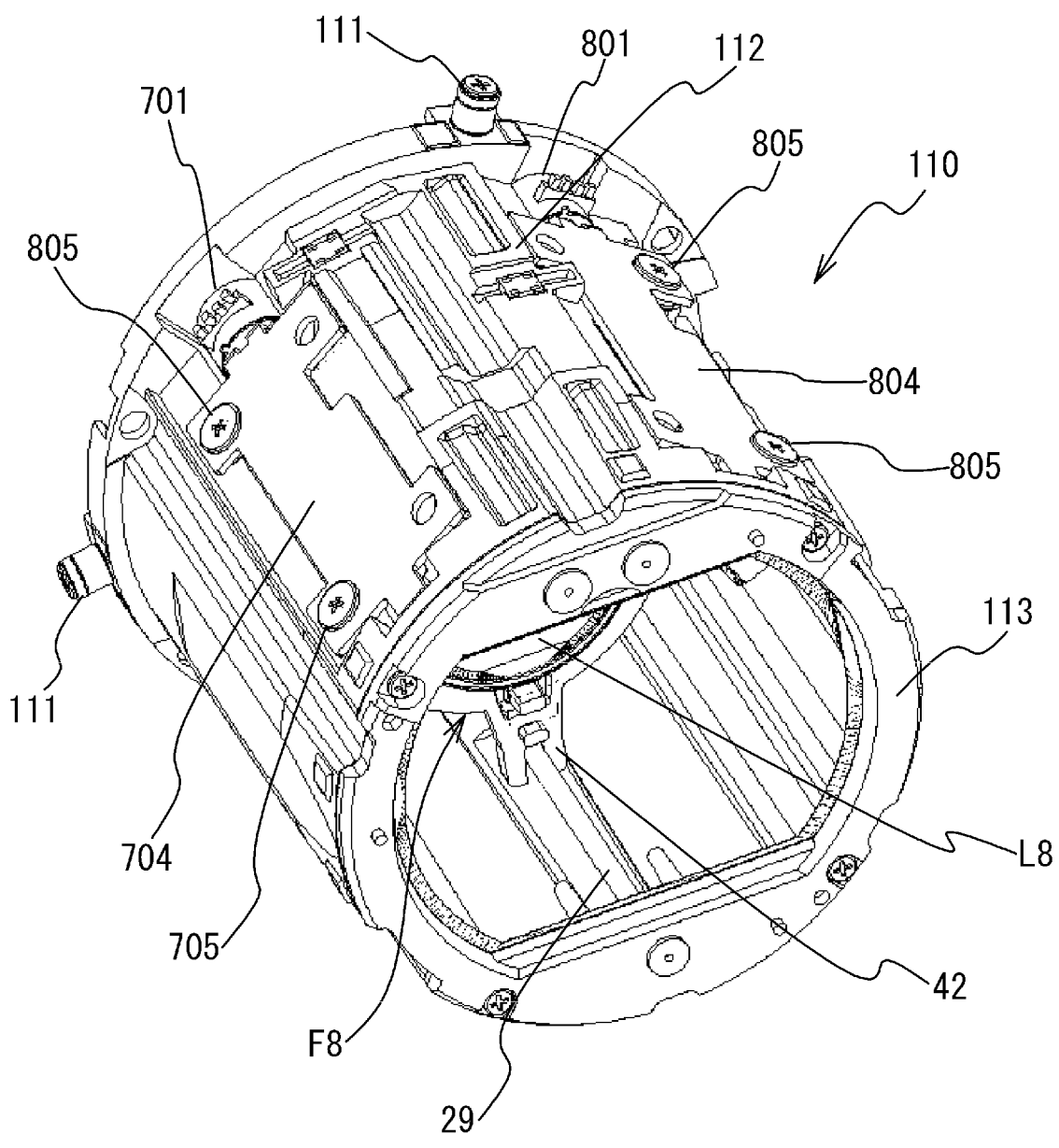
FIG. 2 is a perspective view of a movable barrel viewed from a camera body side.

FIG. 2 is a perspective view of the movable barrel 110 viewed from the camera body 101 side. As illustrated in FIG. 2, the movable barrel 110 includes a barrel portion 112 and a fixing portion 113. Further, the movable barrel 110 has cam pins 111 protruding in a direction intersecting the optical axis OA direction, on the outer peripheral surface of the barrel portion 112.

As illustrated in FIG. 1, the lens barrel 100 includes a fixed barrel 120 disposed radially further outward than the movable barrel 110, and a cam barrel 130 disposed radially further outward than the fixed barrel 120 and rotatable about the optical axis OA. The cam barrel 130 rotates around the optical axis OA in conjunction with the rotation of the zoom control ring.

The fixed barrel 120 has straight grooves (not illustrated in FIG. 1) extending in the optical axis OA direction, and the cam barrel 130 has cam grooves 131. The cam pins 111 of the movable barrel 110 pass through the straight grooves of the fixed barrel 120, respectively, and are slidably fitted in the cam grooves 131 of the cam barrel 130, respectively. Therefore, when the cam barrel 130 rotates around the optical axis OA in conjunction with the rotation of the zoom control ring, the movable barrel 110 is linearly moved in the optical axis OA direction along the cam grooves 131 and the straight grooves. The cam pins 111 may be, for example, cam followers or the like.

As described above, in the lens barrel 100 of the present embodiment, the position of the movable barrel 110 relative to the ninth lens group L9 in the optical axis OA direction changes. Since the first guide bar 27, the second guide bar 28, and the rotation restricting bar 29 are fixed to the movable barrel 110, when the movable barrel 110 moves in the optical axis OA direction, the positions of the first guide bar 27, the second guide bar 28, and the rotation restricting bar 29 with respect to the ninth lens group L9 also change.

Figure 4A:
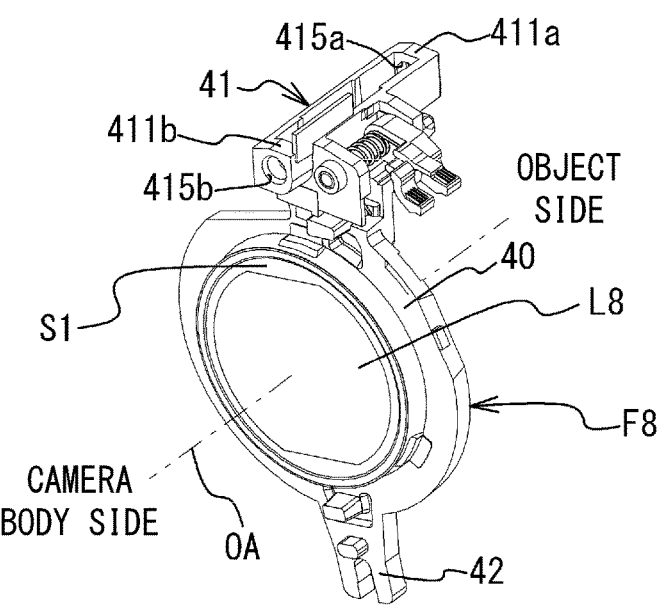
FIG. 4A is a schematic perspective view of an eighth lens holding frame.
Figure 4B:
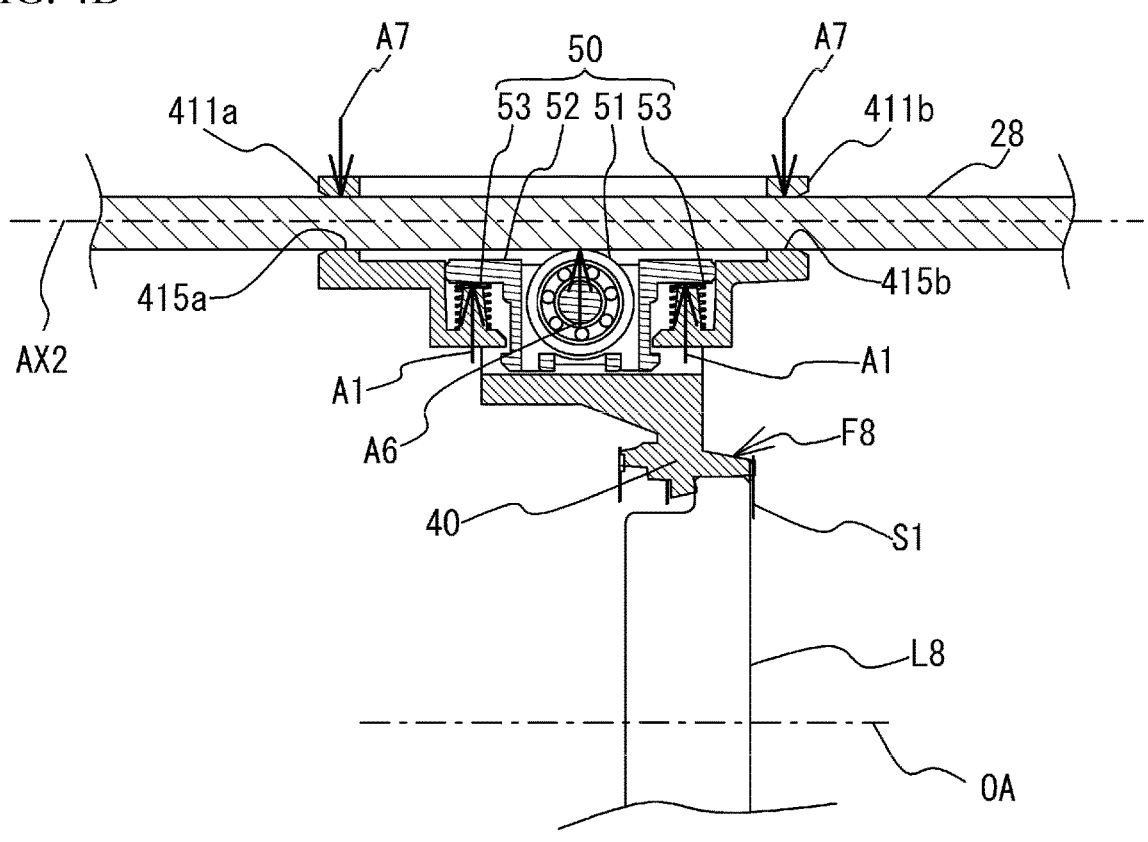
FIG. 4B is a cross-sectional view for describing engagement between the eighth lens holding frame and a guide bar.

Next, the structures of the seventh lens holding frame F7 and the eighth lens holding frame F8 will be described. FIG. 3A and FIG. 3B are schematic perspective views of the seventh lens holding frame F7, and FIG. 3C is a cross-sectional view for describing engagement between the seventh lens holding frame F7 and the first guide bar 27. FIG. 4A is a schematic perspective view of the eighth lens holding frame F8, and FIG. 4B is a cross-sectional view for describing engagement between the eighth lens holding frame F8 and the second guide bar 28.

First, the seventh lens holding frame F7 will be described. As illustrated in FIG. 3A and FIG. 3B, the seventh lens holding frame F7 has a cylindrical portion 30 that holds the seventh lens group L7, and on the outer peripheral portion of the cylindrical portion 30, a first engagement portion 31 that engages with the first guide bar 27 and a first protruding portion 32 that engages with the rotation restricting bar 29 are provided.

As illustrated in FIG. 3B and FIG. 3C, the first engagement portion 31 includes two first plate-shaped portions 311*a* and 311*b* that are substantially orthogonal to the central axis AX1 of the first guide bar 27 and are disposed to be spaced apart from each other in the optical axis OA direction. A hole 315*a* and a hole 315*b* through which the first guide bar 27 is inserted are formed in the first plate-shaped portions 311*a* and 311*b*, respectively.

As illustrated in FIG. 3C, a biasing mechanism 50 is provided inside the first engagement portion 31. The biasing mechanism 50 includes a bearing 51, a bearing support portion 52, and compression springs 53.

The bearing 51 is, for example, a ball bearing having a cylindrical outer shape. The bearing 51 is supported by the bearing support portion 52 and is in contact with the first guide bar 27. The bearing support portion 52 is not in contact with the first guide bar 27. That is, a part of the bearing 51 is located further outward than the bearing support portion 52 in the radial direction of the circle centered on the optical axis OA. Alternatively, a part of the bearing 51 protrudes toward the first guide bar 27 more than the bearing support portion 52. The bearing 51 is not limited to a ball bearing, and may be a general sliding bearing. The bearing 51 may be, for example, a roller bearing or a free ball bearing.

A first end of the compression spring 53 is in contact with the first engagement portion 31, and a second end is in contact with the bearing support portion 52. That is, the compression springs 53 are provided between the first engagement portion 31 (the seventh lens holding frame F7) and the bearing support portion 52. The compression springs 53 bias the bearing 51 toward the first guide bar 27 through the bearing support portion 52. More specifically, the compression springs 53 bias the bearing support portion 52 toward the first guide bar 27 (in a direction indicated by arrows A1 in FIG. 3C). Therefore, the bearing 51 is also biased toward the first guide bar 27 (see an arrow A6) and is pressed against the first guide bar 27. As a result, the first engagement portion 31 is pressed against the first guide bar 27 (see arrows A7). More specifically, the inner peripheral surfaces of the holes 315*a* and 315*b* are pressed against the first guide bar 27. This reduces backlash between the first guide bar 27 and the holes 315*a* and 315*b* (the seventh lens holding frame F7) of the first engagement portion 31. Instead of the compression springs 53, an elastic body such as a torsion spring or rubber may be used. Alternatively, a leaf spring may be used. Alternatively, the bearing 51 may be biased toward the first guide bar 27 without using the bearing support portion 52.

Figures 5A, 5B:
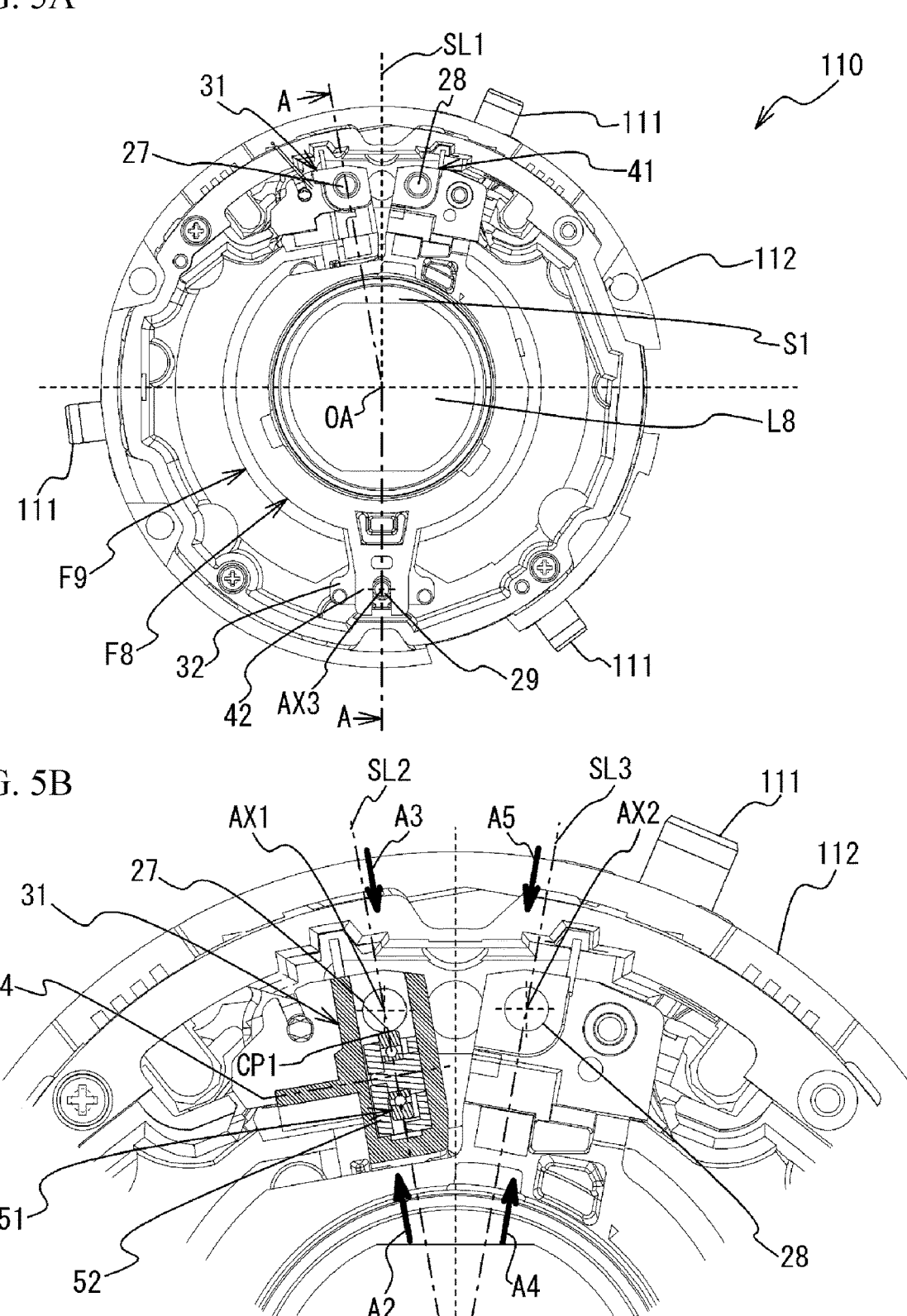
FIG. 5A is a view of the movable barrel from which a fixing portion is removed, as viewed from the camera body side.
FIG. 5B is an enlarged, partial cross-sectional view of the vicinity of a first engagement portion in FIG. 5A.

The direction of the biasing force of the compression springs 53 will be described in more detail. FIG. 5A is a view of the movable barrel 110 from which the fixing portion 113 is removed, as viewed from the camera body 101 side, and FIG. 5B is an enlarged, partial cross-sectional view of the vicinity of the first engagement portion 31 in FIG. 5A.

As illustrated in FIG. 5A, the first guide bar 27 and the second guide bar 28 are arranged symmetrically with respect to a straight line SL1 connecting the center axis AX3 of the rotation restricting bar 29 and the optical axis OA in a plane perpendicular to the optical axis OA. Note that the cross-sectional view of FIG. 1 is a cross-sectional view taken along line A-A in FIG. 5A.

As illustrated in FIG. 5B, the bearing 51 is disposed on a straight line SL2 connecting the optical axis OA and the central axis AX1 of the first guide bar 27 in a plane perpendicular to the optical axis OA. More specifically, the bearing 51 is disposed so that its central axis AX4 is substantially orthogonal to the straight line SL2 in a plane perpendicular to the optical axis OA. In other words, in a plane perpendicular to the optical axis OA, the bearing 51 is disposed so that a straight line that passes through a contact point CP1 between the bearing 51 and the first guide bar 27 and represents the radius of the bearing 51 is substantially parallel to the straight line SL2.

As indicated by an arrow A2 in FIG. 5B, the bearing 51 is biased by the compression springs 53 toward the first guide bar 27 (outward) in a direction substantially parallel to the straight line SL2. As a result, as indicated by an arrow A3 in FIG. 5B, the first engagement portion 31 is pressed against the first guide bar 27 in a direction substantially parallel to the straight line SL2. This reduces backlash between the first guide bar 27 and the holes 315*a* and 315*b* of the first engagement portion 31. In addition, since the direction in which the first engagement portion 31 is pressed against the first guide bar 27 is substantially parallel to the straight line SL2, it is possible to inhibit the central axis of the seventh lens group L7 from being shifted from the optical axis OA.

Next, the eighth lens holding frame F8 will be described. As illustrated in FIG. 4A, the eighth lens holding frame F8 has a cylindrical portion 40 that holds the eighth lens group L8, and on the outer peripheral portion of the cylindrical portion 40, a second engagement portion 41 that engages with the second guide bar 28 and a second protruding portion 42 that engages with the rotation restricting bar 29 are provided.

A sheet S1 is disposed on the rear side (camera body 101 side) of the eighth lens group L8 in the optical axis OA direction. The sheet S1 has an opening having a shape in which upper and lower portions of a circle are cut out in a plane perpendicular to the optical axis OA, and prevents lights reflected by the first guide bar 27, the second guide bar 28, and the rotation restriction bar 29 from entering the imaging region of the imaging element among lights incident on the lens barrel 100 from the object side.

As illustrated in FIG. 4A and FIG. 4B, the second engagement portion 41 includes two second plate-shaped portions 411a and 411b that are substantially orthogonal to the central axis AX2 of the second guide bar 28 and are disposed to be spaced apart from each other in the optical axis OA direction. A hole 415a and a hole 415b through which the second guide bar 28 is inserted are formed in the second plate-shaped portions 411a and 411b, respectively.

As illustrated in FIG. 4B, the biasing mechanism 50 is provided inside the second engagement portion 41. Since the structure of the biasing mechanism 50 is the same as that of the biasing mechanism 50 provided inside the first engagement portion 31, a detailed description thereof will be omitted.

As illustrated in FIG. 4B, the compression springs 53 bias the bearing support portion 52 toward the second guide bar 28 (in a direction indicated by the arrows A1 in FIG. 4B). As a result, the bearing 51 is also biased toward the second guide bar 28 (see the arrow A6) and is pressed against the second guide bar 28. As a result, the second engagement portion 41 is pressed against the second guide bar 28 (see the arrows A7). More specifically, the inner peripheral surfaces of the holes 415a and 415b are pressed against the second guide bar 28. This reduces backlash between the second guide bar 28 and the holes 415a and 415b (the eighth lens holding frame F8) of the second engagement portion 41.

In FIG. 5B, the bearing 51 in the second engagement portion 41 is disposed on a straight line SL3 connecting the optical axis OA and the central axis AX2 of the second guide bar 28 in a plane perpendicular to the optical axis OA, although a cross-sectional view is omitted. As indicated by an arrow A4 in FIG. 5B, the bearing 51 in the second engagement portion 41 is biased by the compression springs 53 toward the second guide bar 28 (outward) in a direction substantially parallel to the straight line SL3. As a result, the second engagement portion 41 is pressed against the second guide bar 28 in a direction substantially parallel to the straight line SL3, as indicated by an arrow A5 in FIG. 5B. This reduces backlash between the second guide bar 28 and the holes 415a and 415b of the second engagement portion 41. In addition, since the direction in which the second engagement portion 41 is pressed against the second guide bar 28 is substantially parallel to the straight line SL3, it is possible to inhibit the central axis of the eighth lens group L8 from being shifted from the optical axis OA.

Figure 6B:
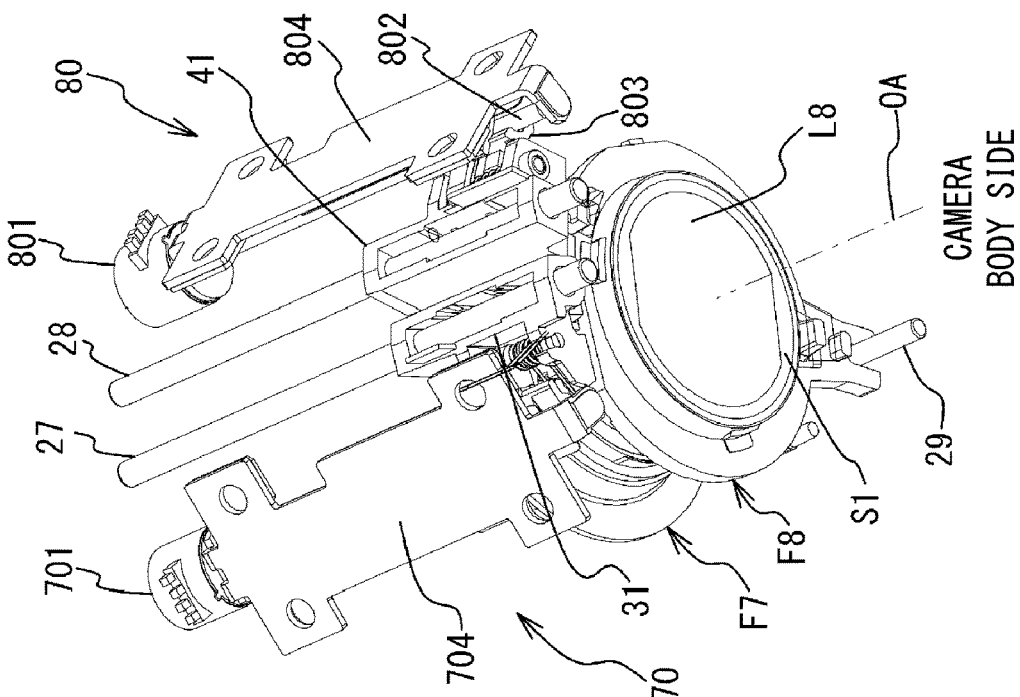
FIG. 6A and FIG. 6B are perspective views illustrating the seventh lens holding frame, the eighth lens holding frame, a first drive source unit, and a second drive source unit.
Figure 6A:
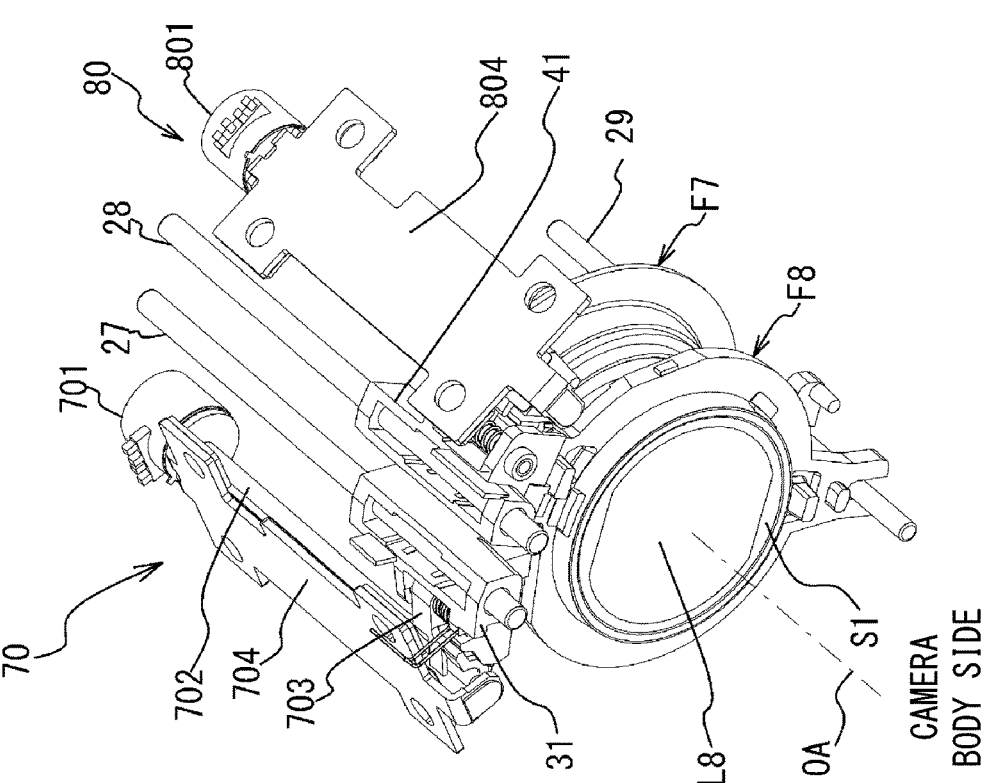

Next, driving of the seventh lens holding frame F7 and the eighth lens holding frame F8 will be described. The seventh lens holding frame F7 is driven by a first drive source unit 70, and the eighth lens holding frame F8 is driven by a second drive source unit 80. FIG. 6A and FIG. 6B are perspective views illustrating the seventh lens holding frame F7, the eighth lens holding frame F8, the first drive source unit 70, and the second drive source unit 80.

When the user rotates the focus operation ring, an encoder (not illustrated) detects the rotation of the focus operation ring, and a control unit (not illustrated) drives a stepping motor 701 included in the first drive source unit 70 and a stepping motor 801 included in the second drive source unit 80 to move the seventh lens holding frame F7 and the eighth lens holding frame F8, respectively. During autofocusing, the stepping motor 701 of the first drive source unit 70 and the stepping motor 801 of the second drive source unit 80 are driven by the control unit (not illustrated).

The first drive source unit 70 includes the stepping motor 701, a lead screw 702, a rack 703, and a mounting member 704. Instead of the first drive source unit 70, a voice coil motor, an ultrasonic motor, or the like may be used.

The lead screw 702 is directly connected to the output shaft of the stepping motor 701 and is rotationally driven by the stepping motor 701.

The stepping motor 701 is fixed to the mounting member 704. Further, the mounting member 704 rotatably supports the lead screw 702. A plurality of holes are formed in the mounting member 704, and the first drive source unit 70 is fixed to the movable barrel 110 by fixing the mounting member 704 to the movable barrel 110 with screws 705 or the like (see FIG. 2).

The rack 703 includes a connecting portion that is connected to the first engagement portion 31 and a contact portion in contact with the lead screw 702. The contact portion has threads having a shape complementary to the threads of the lead screw 702. Thus, when the lead screw 702 is rotated by the stepping motor 701, the rack 703 is moved. As the rack 703 moves, the first engagement portion 31 connected to the connecting portion of the rack 703 is guided by the first guide bar 27 to move linearly in the optical axis OA direction. This allows the seventh lens holding frame F7 to linearly move in the direction of the optical axis OA when the lead screw 702 is rotationally driven.

The second drive source unit 80 includes the stepping motor 801, a lead screw 802, a rack 803, and a mounting member 804. Instead of the second drive source unit 80, a voice coil motor, an ultrasonic motor, or the like may be used.

The lead screw 802 is directly connected to the output shaft of the stepping motor 801 and is rotationally driven by the stepping motor 801.

The stepping motor 801 is fixed to the mounting member 804. Further, the mounting member 804 rotatably supports the lead screw 802. A plurality of holes are formed in the mounting member 804, and the second drive source unit 80 is fixed to the movable barrel 110 by fixing the mounting member 804 to the movable barrel 110 with screws 805 or the like (see FIG. 2).

Similarly, the rack 803 includes a connecting portion connected to the second engagement portion 41 and a contact portion in contact with the lead screw 802. The contact portion is formed with threads having a shape complementary to the threads of the lead screw 802. Thus, when the lead screw 802 is rotated by the stepping motor 801, the rack 803 is moved. As the rack 803 moves, the second engagement portion 41 coupled to the coupling portion of the rack 803 is guided by the second guide bar 28 and moves linearly in the optical axis OA direction. Accordingly, when the lead screw 802 is rotationally driven, the eighth lens holding frame F8 can linearly move in the optical axis OA direction.

Figure 7A:
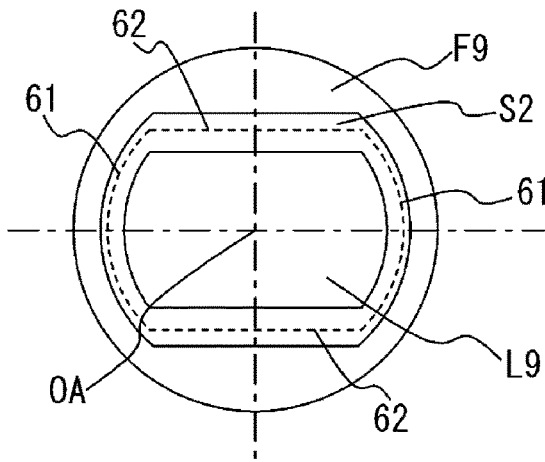
FIG. 7A is a plan view of a ninth lens group and a ninth lens holding frame as viewed from an object side.
Figure 7B:
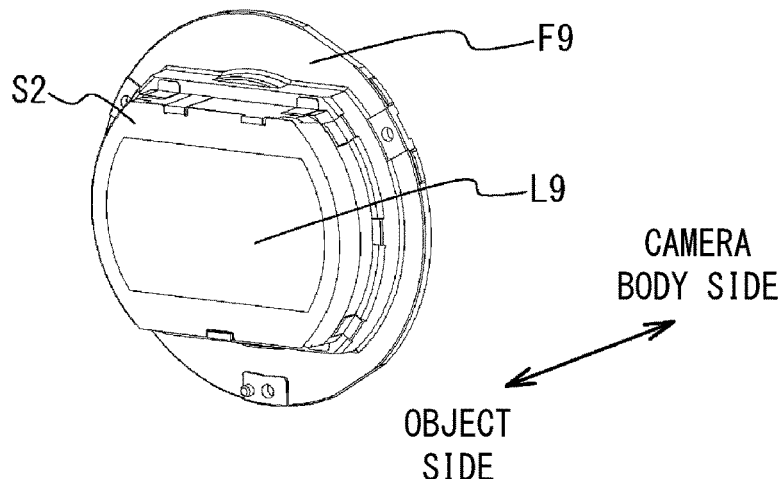
FIG. 7B is a perspective view of the ninth lens group and the ninth lens holding frame as viewed from the object side.
Figure 7C:
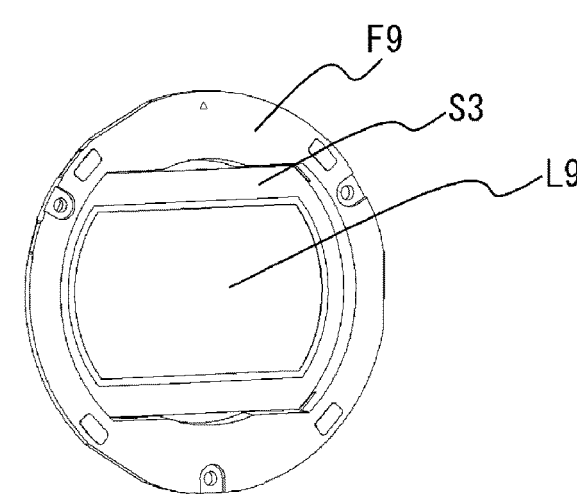
FIG. 7C is a perspective view of the ninth lens group and the ninth lens holding frame as viewed from the camera body side.

Next, the structures of the ninth lens group L9 and the ninth lens holding frame F9 will be described. FIG. 7A is a plan view of the ninth lens group L9 and the ninth lens holding frame F9 as viewed from the object side, FIG. 7B is a perspective view of the ninth lens group L9 and the ninth lens holding frame F9 as viewed from the object side, and FIG. 7C is a perspective view of the ninth lens group L9 and the ninth lens holding frame F9 as viewed from the camera body 101 side. In FIG. 7A, the outer periphery of the ninth lens group L9 is indicated by a dotted line.

As illustrated in FIG. 7A, the planar shape of the ninth lens group L9 on the plane perpendicular to the optical axis OA is a shape (an oval shape or a racetrack shape) obtained by cutting out upper and lower portions of a circle. That is, the outer periphery of the ninth lens group L9 includes two circular arc outer peripheral portions 61 facing each other and linear outer peripheral portions 62 connecting the circular arc outer peripheral portions.

Sheets S2 and S3 are located in front of and behind the ninth lens group L9 in the optical axis OA direction, respectively. Each of the sheets S2 and S3 has an opening having a shape obtained by cutting out upper and lower portions of a circle in a plane perpendicular to the optical axis OA, and prevents light reflected by the first guide bar 27, the second guide bar 28, and the rotation restriction bar 29 from entering the imaging region of the imaging element among lights incident on the lens barrel 100 from the object side.

In the present embodiment, since the ninth lens group L9 has a shape in which upper and lower portions of a circle are cut out, spaces are formed above and below the ninth lens group L9. In the present embodiment, a part of the seventh lens holding frame F7 and a part of the eighth lens holding frame F8 enter the space.

Figure 8A:
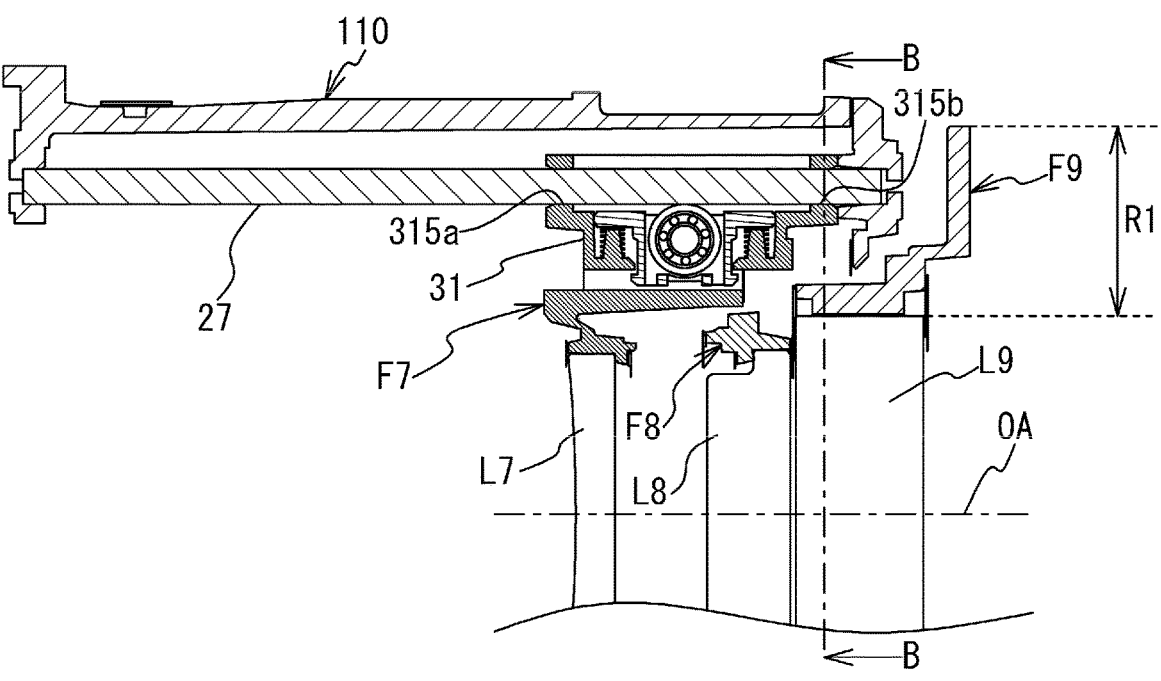
FIG. 8A is a view for describing the relationship between the seventh lens holding frame and the ninth lens group when the seventh lens group is positioned closest to the ninth lens group.
Figure 8B:
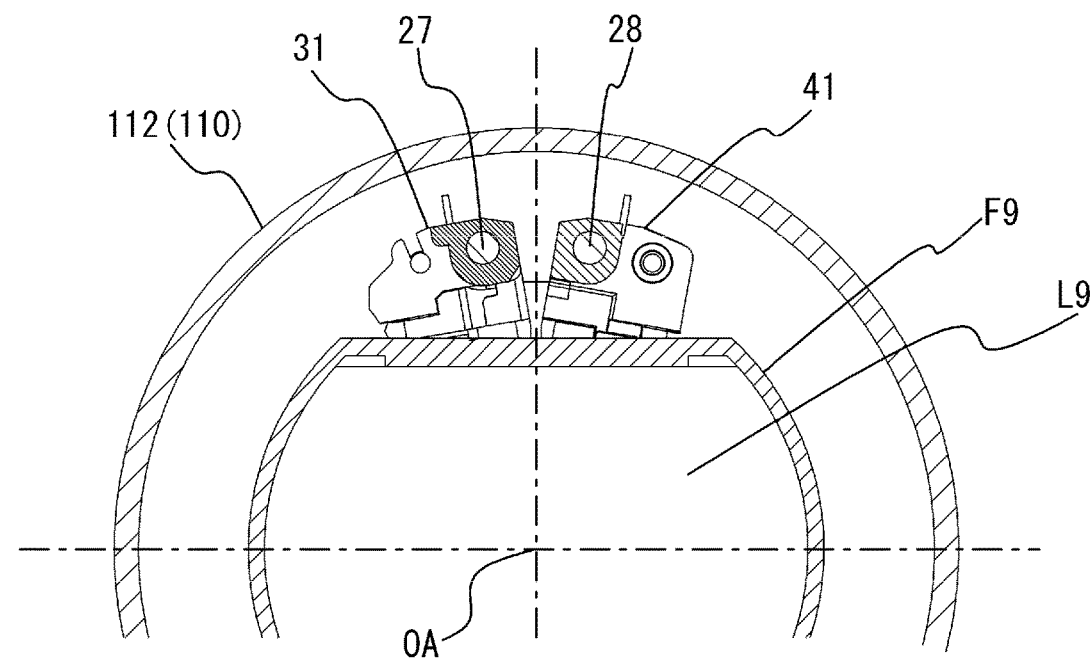
FIG. 8B is a cross-sectional view taken along line B-B in FIG. 8A.

FIG. 8A is a view for describing the relationship between the seventh lens holding frame L7 and the ninth lens group L9 when the seventh lens group F7 is positioned closest to the ninth lens group L9, and FIG. 8B is a cross-sectional view taken along line B-B in FIG. 8A. Note that the state of FIG. 8A is a state in which the zoom position is at the wide end and the seventh lens group L7 and the eighth lens group L8 are at the close-up end.

As illustrated in FIG. 8A, in the present embodiment, when the seventh lens group L7 and the ninth lens group L9 approach closest to each other, a part of the first engagement portion 31 of the seventh lens holding frame F7 is positioned closer to the camera body 101 side (image side) than the surface (frontmost surface) closest to the object side in the optical axis OA direction of the ninth lens group L9. More specifically, when the seventh lens group L7 and the ninth lens group L9 approach closest to each other, in the region R1 between the outer periphery of the ninth lens holding frame F9 and the outer periphery of the ninth lens holding frame L9, a part of the first engagement portion 31 of the seventh lens holding frame F7 is positioned closer to the camera body 101 than the surface closest to the object side of the ninth lens group L9 or the end portion closest to the object side of the ninth lens holding frame F9 in the optical axis OA direction.

In other words, when the seventh lens group L7 and the ninth lens group L9 approach closest to each other, as illustrated in FIG. 8B, the first engagement portion 31 and the ninth lens group L9 overlap each other in the radial direction of the circle centered on the optical axis OA. The same applies to the eighth lens group L8 and the eighth lens holding frame F8.

Figure 9:
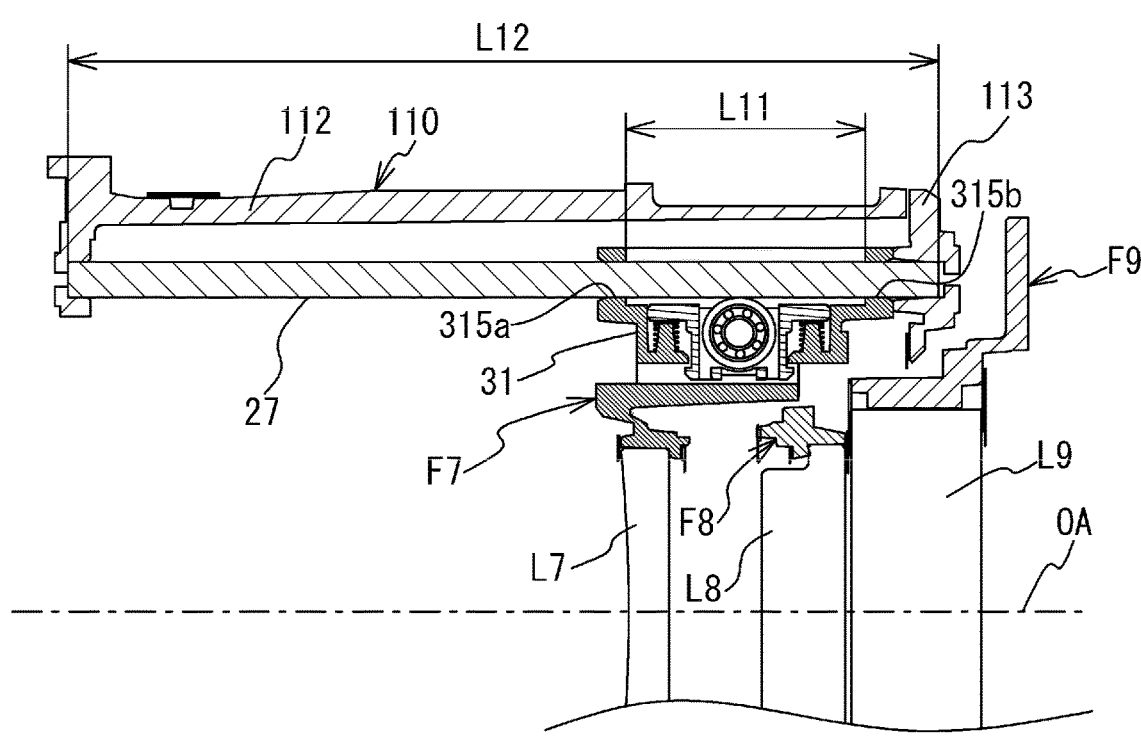
FIG. 9 is a view for describing a length of the guide bar and an engagement length between the guide bar and the first engagement portion in the embodiment.
Figure 10A:
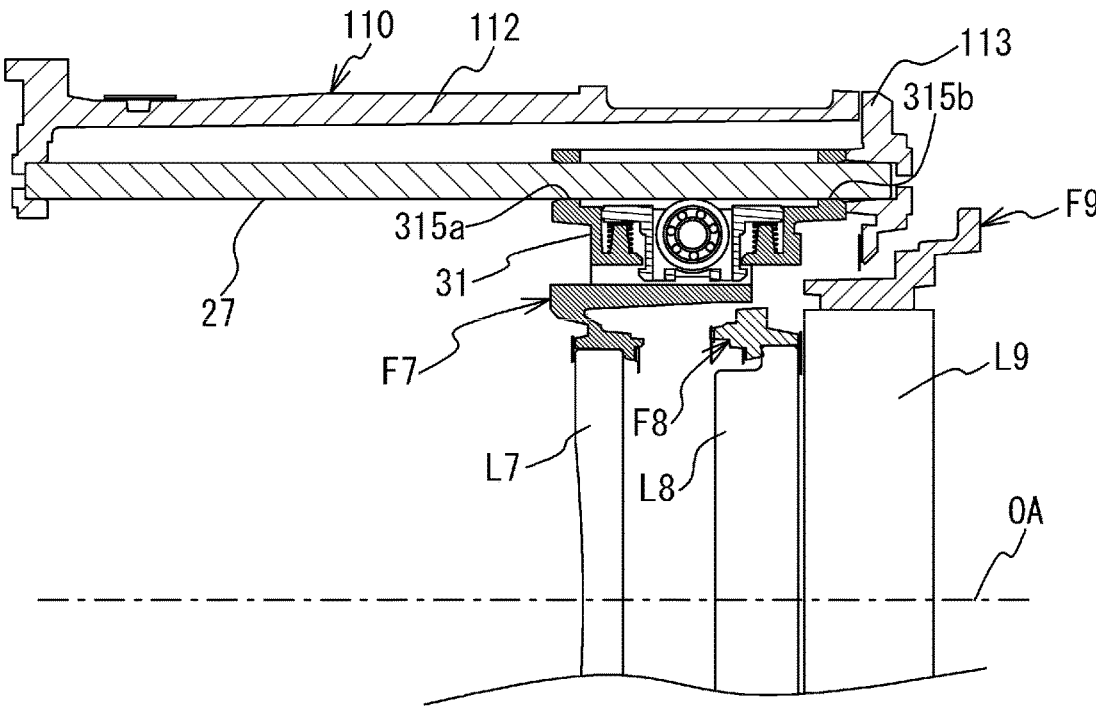
FIG. 10A and FIG. 10B are views for describing the size of the movable barrel, the length of the guide bar, and the engagement length between the guide bar and the first engagement portion when the ninth lens group has a circular shape.
Figure 10B:
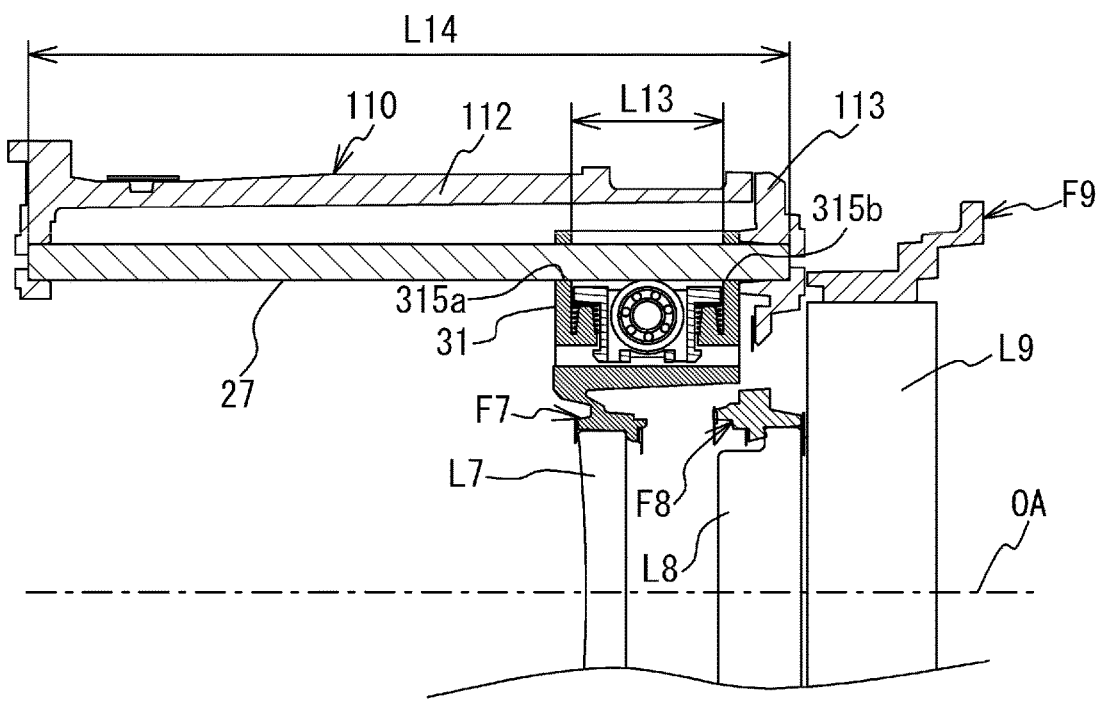

Next, an advantage of forming the planar shape of the ninth lens group L9 into a shape (an oval shape or a racetrack shape) obtained by cutting out upper and lower portions of a circle will be described. FIG. 9 is a view for describing the length of the first guide bar 27 and the engagement length between the first guide bar 27 and the first engagement portion 31 in the present embodiment, while FIG. 10A and FIG. 10B illustrate the size of the movable barrel 110, the length of the first guide bar 27, and the engagement length between the first guide bar 27 and the first engagement portion 31. FIG. 9, FIG. 10A, and FIG. 10B illustrate a state in which the seventh lens group L7 is positioned closest to the ninth lens group L9. In the following description, the first guide bar 27 and the seventh lens group L7 will be described, but the same applies to the second guide bar 28 and the eighth lens group L8.

When the planar shape of the ninth lens group L9 is circular, if the diameter of the movable barrel 110 is the same as that in the present embodiment, the rear end of the movable barrel 110 collides with the ninth lens holding frame F9 in the optical axis OA direction. Here, as illustrated in FIG. 10A, when the inner diameter of the fixing portion 113 is made larger than the outer diameter of the ninth lens group L9 and the diameter of the barrel portion 112 is made larger, the rear end of the movable barrel 110 can be positioned closer to the camera body 101 than the surface closest to the object side of the ninth lens group L9. However, in this case, the diameter of the movable barrel 110 increases, resulting in a larger lens barrel 100. In addition, the first guide bar 27 and the second guide bar 28 are disposed further outward in the radial direction than in the case of FIG. 9, and the first guide bar 27 and the second guide bar 28 are farther away from the optical axis OA, and therefore, the guiding of the seventh lens group L7 and the eighth lens group L8 becomes unstable. In addition, in order to prevent the rear end of the movable barrel 110 from colliding with the ninth lens holding frame F9 without changing the size of the movable barrel 110, for example, as illustrated in FIG. 10B, the length of the movable barrel 110 in the optical axis OA direction is shortened. This also shortens the length of the first guide bar 27.

Even when the length of the first guide bar 27 is shortened, the positional relationship between the seventh lens group L7 and the ninth lens group L9 at the infinite end and the closest end does not change, and thus the length of the first engagement portion 31 in the optical axis OA direction is also shortened. That is, the engagement length between the first engagement portion 31 and the first guide bar 27 is shortened, which may cause the seventh lens group to tilt with respect to the optical axis direction. More specifically, when the positions of the hole 315a and the hole 315b are shifted by a predetermined amount on a plane perpendicular to the optical axis OA, the generated tilt is increased by an amount corresponding to the short engagement length between the first engagement portion 31 and the first guide bar 27.

In the present embodiment, as illustrated in FIG. 9, the movable barrel 110 can enter the space formed by forming the ninth lens group L9 into a shape obtained by cutting out upper and lower portions of a circle, and the rear end (end portion on the camera body 101 side (image side)) of the movable barrel 110 can be positioned closer to the camera body 101 than the surface closest to the object side of the ninth lens group L9. Thus, as illustrated in FIG. 9, the movable barrel 110 can be disposed without increasing the size thereof. The length L12 of the first guide bar 27 can be made longer than that in the case where the ninth lens group L9 is circular (L14 in FIG. 10B). In addition, since the first guide bar 27 becomes longer, the engagement length L11 between the first engagement portion 31 and the first guide bar 27 (the distance between the first plate-shaped portions 311a and 311b of the first engagement portion 31) can be made longer than that in the case where the ninth lens group L9 is circular (L13 in FIG. 10B).

In the present embodiment, since the distance L11 between the holes 315a and 315b can be increased, even when the positions of the holes 315a and 315b are shifted by a predetermined amount on a plane perpendicular to the optical axis OA, the tilt of the seventh lens holding frame F7 with respect to the optical axis OA can be reduced. In addition, as the distance L11 between the hole 315a and the hole 315b is longer, the side pressure applied to the holes 315a and 315b may be smaller. Specifically, when the camera 1 is turned upward or downward, the seventh lens holding frame F7 tries to tilt with the hole 315a or 315b as a fulcrum because of the weight of the seventh lens group L7 and the weight of the seventh lens holding frame F7, causing side pressure in the holes 315a and 315b. In this case, when the distance L11 is long, the side pressure is small due to the principle of leverage, and the friction between the inner surfaces of the holes 315a and 315b and the first guide bar 27 is therefore reduced. Thus, the load applied to the stepping motor 701 can be reduced.

As described above in detail, the lens barrel 100 according to the present embodiment includes the seventh lens holding frame L7 holding the seventh lens group F7, the first guide bar 27 guiding the seventh lens holding frame F7 in the optical axis OA direction, the bearing 51 that is in contact with the first guide bar 27, and the compression springs 53 that are in contact with the seventh lens holding frame F7 and bias the bearing 51 toward the first guide bar 27. The compression spring 53 having an end in contact with the seventh lens holding frame F7 biases the bearing 51 toward the first guide bar 27, whereby the seventh lens holding frame F7 is pressed against the first guide bar 27. More specifically, the inner surfaces of the holes 315a and 315b of the first engagement portion 31 of the seventh lens holding frame F7 are pressed against the first guide bar 27. Therefore, it is possible to reduce backlash between the first guide bar 27 and the holes 315a and 315b (backlash between the first guide bar 27 and the seventh lens holding frame F7).

In the present embodiment, the bearing 51 is pressed against the first guide bar 27 by the compression springs 53. This allows the bearing 51 to remain in contact with the first guide bar 27, thereby reducing backlash between the first guide bar 27 and the holes 315a and 315b.

In addition, in the present embodiment, the lens barrel 100 includes the bearing support portion 52 that supports the bearing 51, the compression springs 53 are provided between the seventh lens holding frame F7 and the bearing support portion 52 and bias the bearing support portion 52 toward the first guide bar 27, and at least a part of the bearing 51 is located further outward than the bearing support portion 52 in the radial direction of the circle centered on the optical axis OA. By using the bearing support portion 52, the bearing 51 can be easily biased toward the first guide bar 27. Further, since the bearing support portion 52 is not in contact with the first guide bar 27, the torque required to move the seventh lens holding frame F7 in the optical axis OA direction can be reduced as compared with the case where the bearing support portion 52 is in contact with the first guide bar 27. Thus, the load on the stepping motor 701 can be reduced.

In addition, in the present embodiment, the bearing 51 rotates with the movement of the seventh lens holding frame F7. Thereby, the seventh lens holding frame F7 can be smoothly moved in the optical axis OA direction. Further, the torque required to move the seventh lens holding frame F7 in the optical axis OA direction can be reduced, and the load on the stepping motor 701 can be reduced.

In the present embodiment, the bearing 51 is disposed on the straight line SL2 connecting the central axis AX1 of the first guide bar 27 and the optical axis OA in the plane orthogonal to the optical axis OA. This inhibits the central axis of the seventh lens group L7 from shifting from the optical axis OA.

In the present embodiment, the direction of the biasing force of the compression springs 53 (see the arrows A2 in FIG. 5B) is substantially parallel to the straight line SL2. Accordingly, since the seventh lens holding frame F7 holding the seventh lens group L7 is pressed against the first guide bar 27 in the direction substantially parallel to the straight line SL2, it is possible to inhibit the central axis of the seventh lens group L7 from being shifted from the optical axes OA.

In the present embodiment, the bearing 51 has a cylindrical outer shape, and the central axis AX4 of the bearing 51 is substantially orthogonal to the straight line SL2 in a plane orthogonal to the optical axis OA. As a result, the direction in which the bearing 51 is pressed against the first guide bar 27 can be made substantially parallel to the straight line SL2, and the seventh lens holding frame F7 is pressed against the first guide bar 27 in the direction substantially parallel to the straight line SL2. Therefore, it is possible to inhibit the central axis of the seventh lens group L7 from being shifted from the optical axes OA.

In addition, in the present embodiment, the seventh lens holding frame F7 includes the hole 315a and the hole 315b that are spaced from each other in the optical axis OA direction and through which the first guide bar 27 is inserted, and the bearing 51 is disposed between the hole 315a and the hole 315b in the optical axis OA direction. Thus, the hole 315a and the hole 315b can be pressed against the first guide bar 27 in a well-balanced manner. In addition, the space inside the first engagement portion 31 can be effectively utilized.

In addition, in the present embodiment, the lens barrel 100 includes the ninth lens group L7 disposed closer to the image side than the seventh lens group L9, and the ninth lens group L9 has a shape obtained by cutting out upper and lower portions of a circle in a plane perpendicular to the optical axis OA. With this configuration, the weight of the ninth lens group L9 can be reduced, and thus the weight of the lens barrel 100 can be reduced.

In the present embodiment, when the seventh lens group L7 and the ninth lens group L9 approach closest to each other, a part of the seventh lens holding frame F7 (a part of the first engagement portion 31) is positioned closer to the image side than the surface closest to the object side of the ninth lens group L9 in the optical axis OA direction. In other words, when the seventh lens group L7 and the ninth lens group L9 approach closest to each other, the ninth lens group L9 and a part of the seventh lens holding frame overlap each other in the radial direction of the circle centered on the optical axis OA. This allows the distance between the first guide bar 27 and the optical axis OA to be shorter than when the planar shape of the ninth lens group L9 is circular. Since the first guide bar 27 is close to the optical axis OA, it is possible to shorten the distance of the connecting portion connecting the cylindrical portion 30 and the first engagement portion 31 of the seventh lens holding frame F7 in the radial direction around the optical axis OA. As a result, the weight of the seventh lens holding frame F7 can be reduced, and thus the weight of the lens barrel 100 can be reduced. In addition, since the length of the first guide bar 27 and the distance between the holes 315a and 315b can be increased, the tilt of the central axis of the seventh lens group L7 with respect to the optical axis OA can be reduced.

Further, in the present embodiment, the lens barrel 100 includes the eighth lens holding frame L8 that holds the eighth lens group F8 and the second guide bar 28 that guides the eighth lens holding frame F8 in the optical axis OA direction, and when the eighth lens group L8 and the ninth lens group L9 approach closest to each other, a part of the eighth lens holding frame F8 is positioned closer to the image side than the surface closest to the object side of the ninth lens group L9 in the optical axis OA direction. This allows the distance between the second guide bar 28 and the optical axis OA to be shorter than when the planar shape of the ninth lens group L9 is circular. Since the second guide bar 28 is close to the optical axis OA, it is possible to shorten the distance of the connecting portion connecting the cylindrical portion 40 and the second engagement portion 41 of the eighth lens holding frame F8 in the radial direction around the optical axis OA. This allows the weight of the eighth lens holding frame F8 to be reduced, which in turn reduces the weight of the lens barrel 100. In addition, since the length of the second guide bar 28 and the distance between the holes 415a and 415b can be increased, the tilt of the central axis of the eighth lens group L8 with respect to the optical axis OA can be reduced.

In the above-described embodiment, the bearing 51 may be a resin bearing or may be formed by press-fitting a resin such as polyacetal into an outer diameter thereof. Instead of the bearing 51, for example, a member made of metal, plastic, or resin other than the bearing 51 may be in contact with the first guide bar 27 and the second guide bar 28. Further, the outer shapes of the members in contact with the first guide bar 27 and the second guide bar 28 are not limited to a cylindrical shape, and may be a rectangular parallelepiped shape, for example.

In the above-described embodiment, the lens barrel 100 includes a plurality of focus lens groups, but the above-described embodiment can also be applied to a case where there is one focus lens group. Although the lens barrel 100 is a zoom lens in the above-described embodiment, the lens barrel 100 may be a single-focus lens.

In addition, the number and arrangement of the lens groups included in the lens barrel 100 are not limited to the above-described embodiment. In addition, the configuration for moving the movable barrel 110 in the optical axis OA direction is not limited to the above-described embodiment. For example, the movable barrel 110 may be guided in the optical axis OA direction by a guide bar instead of the straight groove. The movable barrel 110 may be a fixed barrel that does not move in the optical axis OA direction. In addition, although the first drive source unit 70 and the second drive source unit 80 have been described as having a rack, they may have a nut.

The embodiments described above are examples of preferred implementations. However, the present invention is not limited thereto, and various modifications can be made without departing from the scope of the present invention, and arbitrary constituent elements may be combined.

DESCRIPTION OF REFERENCE NUMERALS 1 camera
27 first guide bar
28 second guide bar
51 bearing
52 bearing support portion 53 compression spring
100 lens barrel
101 camera body
110 movable barrel
315a, 315b hole
415a, 415b hole
F7 seventh lens holding frame
F8 eighth lens holding frame
F9 ninth lens holding frame
L7 seventh lens group
L8 eighth lens group
L9 ninth lens group

The invention claimed is:

1. A lens barrel comprising:
a first lens holding frame that holds a first lens;
a first guide portion that guides the first lens holding frame in an optical axis direction;
a bearing that is pressed against the first guide portion and rotates with movement of the first lens holding frame;
a biasing member that is in contact with the first lens holding frame and biases the bearing toward the first guide portion; and
a second lens holding frame that holds a second lens that is arranged closer to an image side than the first lens,
wherein when the first lens and the second lens come closer to each other, a part of the first lens holding frame is located closer to the image side than a surface closest to an object of the second lens in an optical axis direction, and
wherein the biasing member is not in direct contact with the bearing.

2. The lens barrel according to claim 1, wherein the first guide portion includes (i) a main guide bar, which guides the first lens holding frame in the optical axis direction, and (ii) a rotation restriction bar that restricts rotation of the first lens holding frame.

3. The lens barrel according to claim 2, wherein the biasing member biases the bearing toward the main guide bar.

4. The lens barrel according to claim 2,
wherein the first lens holding frame includes a first engagement portion that engages with the main guide bar,
wherein the first engagement portion extends in the optical axis direction and engages with the main guide bar at two positions, and
wherein when the first lens and the second lens come closer to each other, at least a part of the second lens holding frame is located on an inner peripheral side of the first engagement portion.

5. The lens barrel according to claim 2,
wherein the first lens holding frame includes a first engagement portion that engages with the main guide bar and a first protrusion portion that engages with the rotation restriction bar, and
wherein a length of the first engagement portion in the optical axis direction is greater than a length of the first protrusion portion in the optical axis direction.

6. The lens barrel according to claim 2, wherein the biasing member is disposed radially further inward than the main guide bar.

7. The lens barrel according to claim 1, wherein the biasing member is composed of a spring.

8. The lens barrel according to claim 7, wherein the biasing member is a compression spring.

9. The lens barrel according to claim 1, wherein the biasing member biases the bearing toward the first guide portion along a radial direction of a circle centered on an optical axis of the lens barrel.

10. The lens barrel according to claim 1, wherein a central axis of the bearing is disposed closer to an image plane side than a center of the first lens in the optical axis direction.

11. The lens barrel according to claim 1, wherein the first lens holding frame includes a support member that supports a central axis of the bearing.

12. The lens barrel according to claim 1, further comprising a third lens holding frame that holds a third lens disposed closer to an image plane side than the second lens, wherein the third lens holding frame is fixed during focusing.

13. The lens barrel according to claim 12, further comprising:

a first drive source that drives the first lens holding frame; and a second drive source that is of the same type as the first drive source and drives the second lens holding frame.

14. The lens barrel according to claim 13, wherein the first drive source is a stepping motor or a voice coil motor.

15. The lens barrel according to claim 1, wherein the first lens holding frame and the second lens holding frame move along an optical axis of the lens barrel during focusing.

16. The lens barrel according to claim 13, wherein an outer barrel is provided around an outer periphery of the first lens holding frame and the second lens holding frame, and wherein the first drive source and the second drive source are fixed to the outer barrel.

17. The lens barrel according to claim 16, wherein the first guide portion is fixed to the outer barrel.

18. The lens barrel according to claim 16, wherein the outer barrel moves in the optical axis direction during zooming, and wherein positions of the first guide portion, the first drive source, and the second drive source in the optical axis direction change with movement of the outer barrel.

19. The lens barrel according to claim 1, wherein the first lens holding frame and the second lens holding frame are arranged adjacent to each other.

20. An imaging device comprising:

the lens barrel according to claim 1; and an imaging element.

* * * * *